(12) United States Patent
Yon et al.

(10) Patent No.: US 6,363,426 B1
(45) Date of Patent: Mar. 26, 2002

(54) SYSTEM AND METHOD OF ALLOCATING MODEM RESOURCES TO SOFTWARE APPLICATIONS

(75) Inventors: David A. Yon, Cranston, RI (US); Michael M. Krueger, Amherst, NH (US)

(73) Assignee: Dialout.Net, Inc., Amherst, NH (US)

( * ) Notice: Subject to any disclaimer, the term of this patent is extended or adjusted under 35 U.S.C. 154(b) by 0 days.

(21) Appl. No.: 09/479,176

(22) Filed: Jan. 7, 2000

(51) Int. Cl.$^7$ .............................................. G06F 15/173
(52) U.S. Cl. ........................ 709/226; 709/201; 709/227
(58) Field of Search ................................. 709/201, 226, 709/227; 375/222; 710/36, 64; 370/237; 455/424

(56) References Cited

U.S. PATENT DOCUMENTS

| | | | | |
|---|---|---|---|---|
| 5,628,030 A | * | 5/1997 | Tuckner | 710/64 |
| 5,631,897 A | * | 5/1997 | Pacheco et al. | 370/237 |
| 5,737,397 A | | 4/1998 | Skinner et al. | 379/93.29 |
| 5,754,590 A | | 5/1998 | Bays et al. | 375/222 |
| 5,790,895 A | | 8/1998 | Krontz et al. | 395/884 |
| 5,864,758 A | * | 1/1999 | Moon | 455/424 |
| 5,925,114 A | | 7/1999 | Hoang | 710/48 |
| 5,938,745 A | * | 8/1999 | Boyle | 710/46 |
| 5,978,373 A | | 11/1999 | Hoff et al. | 370/392 |

FOREIGN PATENT DOCUMENTS

| | | |
|---|---|---|
| WO | WO 9747124 | 12/1997 |
| WO | WO 9801977 | 1/1998 |
| WO | WO 9807205 | 2/1998 |
| WO | WO 9807285 | 2/1998 |
| WO | WO 9814022 | 4/1998 |
| WO | WO 9824229 | 6/1998 |
| WO | WO 9900740 | 1/1999 |
| WO | WO 9900969 | 1/1999 |
| WO | WO 9939530 | 8/1999 |
| WO | WO 9953404 | 10/1999 |
| WO | WO 0005895 | 2/2000 |

OTHER PUBLICATIONS

Andrew S. Tanenbaum, Structured Computer Organization, Sec 1.4. Hardware, Software and Multilevel Machines, Prentice–Hall, 1990, p. 11.*
A. Chame, A digital signal processor yields enhanced data/FAX pump, Proceedings Aerospace Conference 1997, IEEE, Feb. 1997, vol. 4.*

* cited by examiner

*Primary Examiner*—Patrice Winder
(74) *Attorney, Agent, or Firm*—Bourque & Associates, P.A.

(57) ABSTRACT

A system and method of delaying the assignment of a modem data pump to a software application running on a client computer which is communicating with a computer network that provides a plurality of data pumps for assignment to software applications. The system separates modem function into a modem controller, which is provided locally to each client computer on which a software application is running that is to interact with a modem, and a data pump, remote from the user computer and connected by computer network, which is selected and allocated by a data pump allocator after the modem controller has obtained all modem information from the software application. The modem controller interacts with the software application providing the required timing, protocol and reply functions to prevent the software application from detecting an error based on modem communications. The modem controller also stores modem commands issued by the software application to be able to initialize the selected data pump to the state at which a local modem would have been had the local modem been interacting with the software application. The data pump allocator receives the modem state information and selects the proper data pump for the software application based on type of data pump needed, geographic location and availability and initializes the selected data pump based on the initialization sequence issued by the software application.

7 Claims, 4 Drawing Sheets

SYSTEM AND METHOD OF ALLOCATING MODEM RESOURCES TO SOFTWARE APPLICATIONS

FIELD OF THE INVENTION

The present invention concerns the field of allocating or assigning modems from one or more modem banks to a plurality of software applications requiring a modem. More specifically, the invention concerns a system and method that segregates the functional components of modems and delays the allocation of a data pump to a software application until a point when the software application requires a physical modem.

BACKGROUND OF THE INVENTION

Computer software applications use modems by issuing a series of commands to the modem often called the "AT Command set" (such as "AT&V" or "ATDT 555-1234"). When a software (client) application opens a communication port to a modem, it expects an immediate, near-zero-latency connection to the modem. When a modem processes a command issued by the software application, it provides a response (such as "OK" or "ERROR") to the application. Upon the processing of a command, a modem may also modify its internal state or it may initiate an action, such as dialing or hanging up a modem call.

FIG. 1 shows one common, prior art configuration by which a modem is interfaced with a software application. In this configuration, the software application 10 allocates a modem by opening a communications port 14 (COM port) provided by the computer's operating system 12. The COM port 14 is directly attached to a modem 18 via a direct connection 16, such as a cable or bus interface. The software application 10 then interacts with the modem 18 beginning with the first modem command that is issued by the software application 10. In this case, the type of modem needed is known and application-to-modem timing issues are non-existent.

Another well-known, prior art, configuration for interfacing a modem to a software application utilizes a "static modem allocator". Such a configuration, as shown in FIG. 2, is prevalent with modern client-server systems, where one or more client computers 20 communicate with a network server 30 over a computer network 28, such as a local area network (LAN). In this configuration, the COM port 14 of the configuration of FIG. 1 is replaced by a "virtual COM port" 26. Thus, instead of opening a physical COM port and allocating a physical modem, the software application 22 of this configuration opens a virtual COM port 26 provided by the operating system 24.

In this configuration, the direct modem connection is replaced by several components that allow the application to use any one of a number of modems that are attached to the network server 30. These components include the LAN 28, which provides a communications link between the client computer 20 and the network server 30. The server 30 has a simple modem allocator 32 that selects an available modem from a set of modems 34a–n before a first modem command is issued by the software application.

As in the direct attachment configuration, once an available modem is allocated to the software application 22 by the modem allocator 32, the software application 22 interacts with a specific physical modem 34 beginning with the first modem command. This is the method widely used by today's modem-sharing server systems and related software. Again in this configuration, a physical modem is allocated and timing issues are minimal.

However, there are situations where the selection of a modem will depend, in large part, on information contained in commands issued by a software application subsequent to the first command. This means that some portion of the interaction of the application with a modem must occur before the specific modem to be allocated can be chosen and selected.

For example, a modem command issued by a software application may indicate that the application requires a specific type of modem (e.g. a fax modem, analog modem or an ISDN modem). If not all of the available modems are of the required type, then a modem cannot be allocated until after the specific type is identified.

In addition, with the increased use of large scale computer networks, such as the Internet, there are situations where available modems may be geographically dispersed in order to take advantage of low cost network-based data transmission over great distances and only utilize more costly public switched telephone network (PSTN) lines where they are more cost effective to use and/or necessary (i.e. for local telephone connections between the computer running the software application and the large scale computer network and/or the large scale computer network and an ultimate destination). In such situations, a final modem command may be a dial command, and it is only at that time that a modem can be selected utilizing a least-cost routing or other similar algorithm.

In addition, by waiting until the dial command is issued, the load on the large scale computer network will be minimized until a modem is actually required. In other words, the software application does not need to access a physical modem until it performs an operation that requires interaction with the PSTN. Before that point, it only serves to increase system load to allocate a modem when, in fact, the software application does not require it.

However, delaying the point at which an actual modem is allocated to a software application creates several additional problems that must be addressed. First, modem commands modify the internal state of a modem incrementally. In other words, at any point in time, a modem's current state is the result of a series of commands that it has received in a specific order. Software applications also expect to receive immediate and certain responses from a modem upon the issuance of certain commands. Therefore, if a modem has not been assigned to a software application to receive and respond to commands issued by the software application, the application will, in most instances, report an error condition and may not initialize properly.

Also, if a modem is not allocated to an application until a later point in time, then, even if the software application does not detect an error, the allocated modem may not be in the required state to accept additional commands from a software application subsequent to the allocation of the modem to the application.

Accordingly, what is needed is a system and method of allocating modems to software applications that is compatible with the delayed allocation of modems. Such a system and method must be able to accurately determine and maintain a proper desired state of a modem at the time of modem allocation and provide the required responses to various software applications with the proper timing sequence upon the issuance of response-requiring modem commands.

SUMMARY OF THE INVENTION

The present invention provides a system and method of delayed modem assignment which overcome the problems associated with delaying the allocation or assignment of a physical modem to a specific software application until one is ultimately required, i.e. upon the issuance of a dial-out command.

The present invention introduces a new modem architecture wherein the two major components included in all current modems, i.e. the modem controller and the data pump, are separated. The system of the present invention provides a modem controller closely coupled to the software application to control and account for the effects of modem controller timing issues between the modem controller and the software application. Preferably, the modem controller is implemented in software running on the same computer running the software application. The system distributes a plurality of data pumps, which can be assigned or allocated to a modem controller at an optimum point in time so as to promote operational efficiency.

In order to properly assign or allocate a data pump to a modem controller, the system of the present invention also includes a delayed data pump allocator, which receives a data pump allocation request issued by a modem controller and which selects a best fit data pump to allocate to the requesting modem controller from a set of available data pumps.

The delayed modem allocation system also includes a data pump initializer, which obtains modem command information from the requesting modem controller and which initializes a selected data pump to a proper, desired state. Once initialized, the selected data pump is assigned to the requesting modem controller and the modem controller directly controls the functioning of the assigned data pump.

The method of the present invention begins by segregating the two functional components of a typical modem—the modem controller and the data pump. The modem controller functionality, i.e. the control of the interaction of the modem with a computer, is performed by a local modem controller, which is preferably implemented in software running on the same computer that is running a software application that will ultimately require a modem connection. The data pump functionality, i.e. the management of sending and/or receiving data over a telephone line, is provided by one of a plurality of distributed data pumps that communicate with a modem controller over a network such as the Internet.

When the software application begins interacting with a modem, the modem controller handles the initial interaction. However, when the interaction between the software application and the modem controller progresses to a point where the software application requires that the modem controller issue a "dial" or other similar "connect" command, the modem controller will then issue a data pump allocation request to a data pump allocator. The allocation request will include all of the information necessary to initialize a data pump and index the assigned data pump to a current state that matches the state expected by the software application.

When the data pump allocator receives an allocation request, it will then search a data pump table managed by the data pump allocator and select a best fit data pump to allocate to the modem controller issuing the data pump allocation request. Once selected, data pump will be properly initialized and indexed to the expected state by a data pump initializer.

Once the data pump has been initialized, the data pump allocator will connect the allocated data pump to the requesting modem controller at which point in time the modem controller will take over all control of the allocated data pump until the software application indicates that the data pump is no longer required. At that point in time, the connection between the modem controller and the data pump will be terminated and the terminated data pump will once again be available for allocation to a requesting modem controller by the data pump allocator.

DESCRIPTION OF THE DRAWINGS

These, and other features of the present invention will be better understood by reading the following detailed description of the invention take together with the drawings wherein.

DETAILED DESCRIPTION OF THE INVENTION

Figure 1:
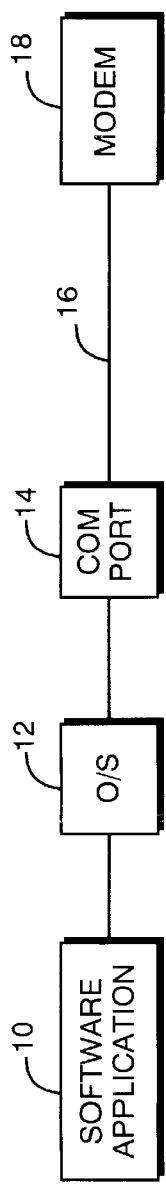
FIG. 1 is a block diagram showing a physical modem directly connected to a software application according to prior art teachings.
Figure 2:
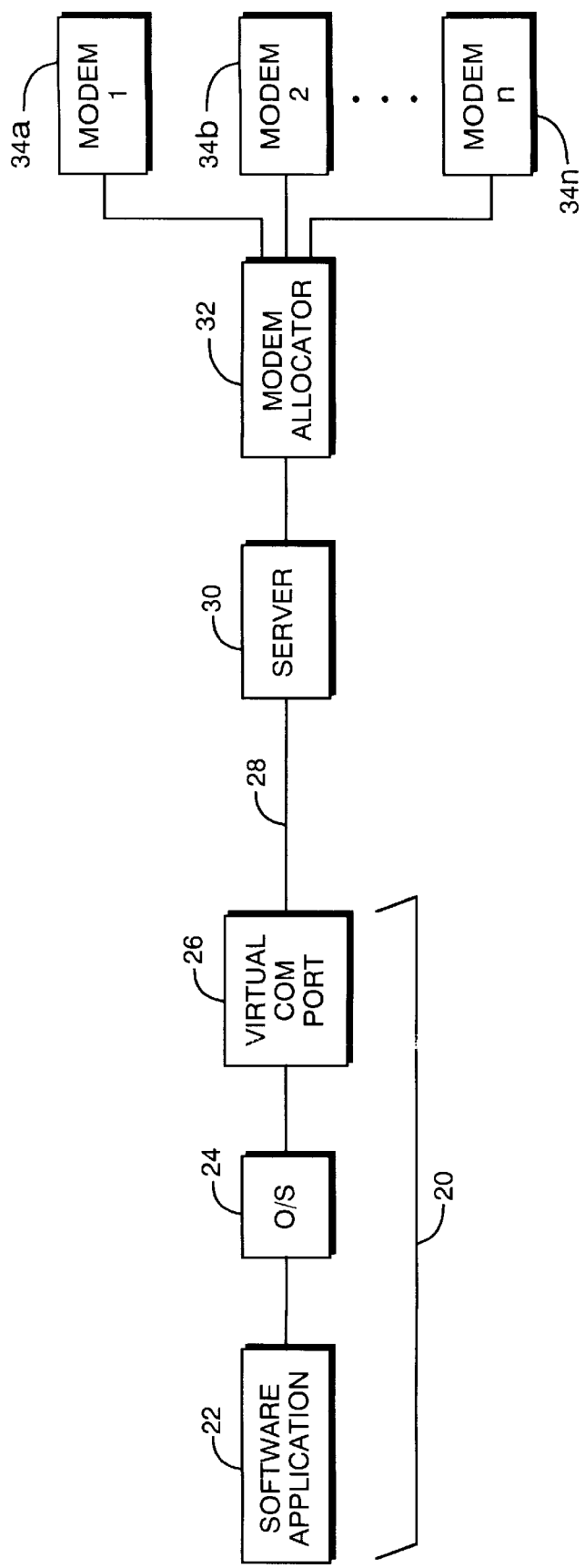
FIG. 2 is a block diagram showing a physical modem connected to a software application via a server according to prior art teachings.
Figure 3:
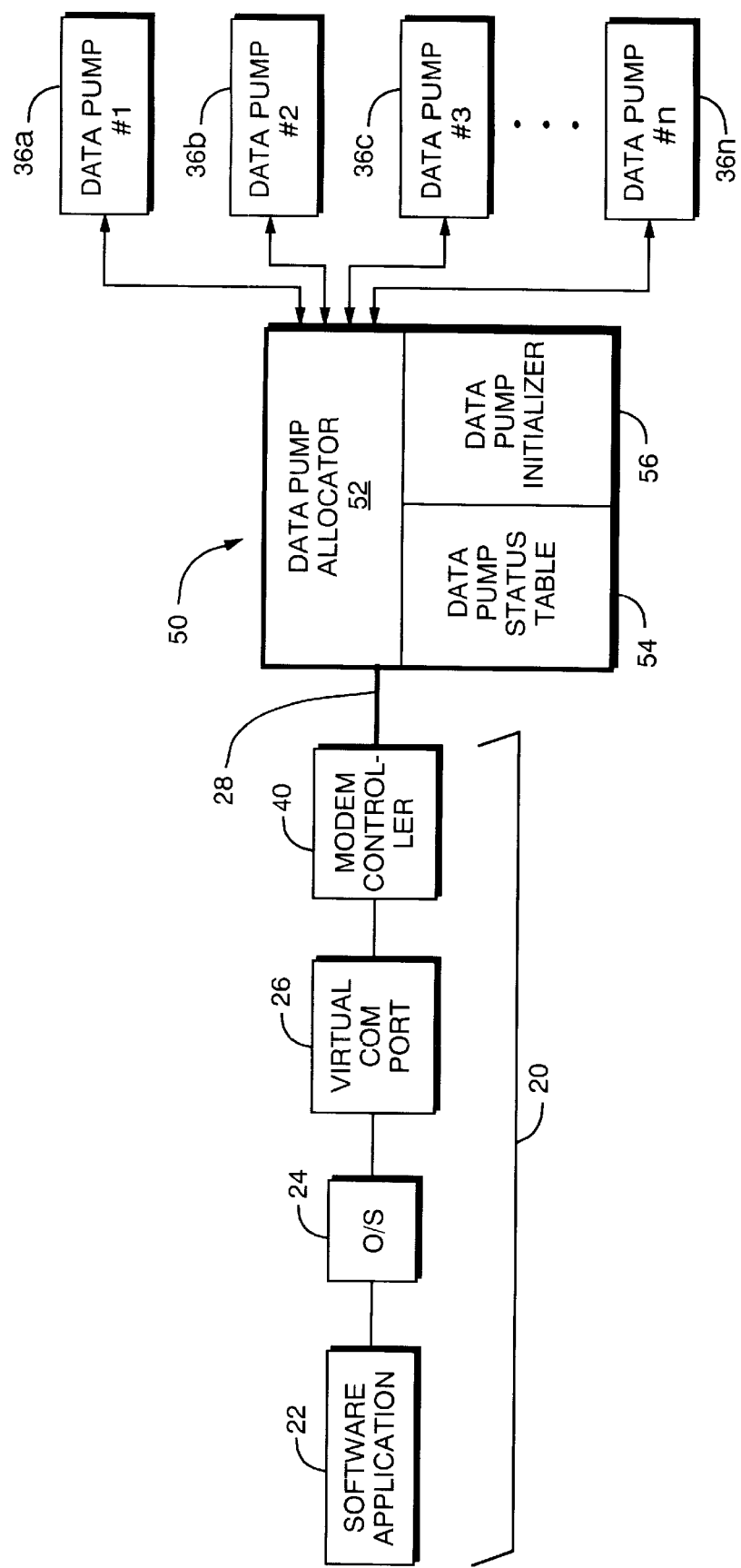
FIG. 3 is a block diagram showing separation of the modem controller and data pump functions and showing the connection of a physical modem to a software application using the delayed modem allocation system of the present invention.
Figure 4:
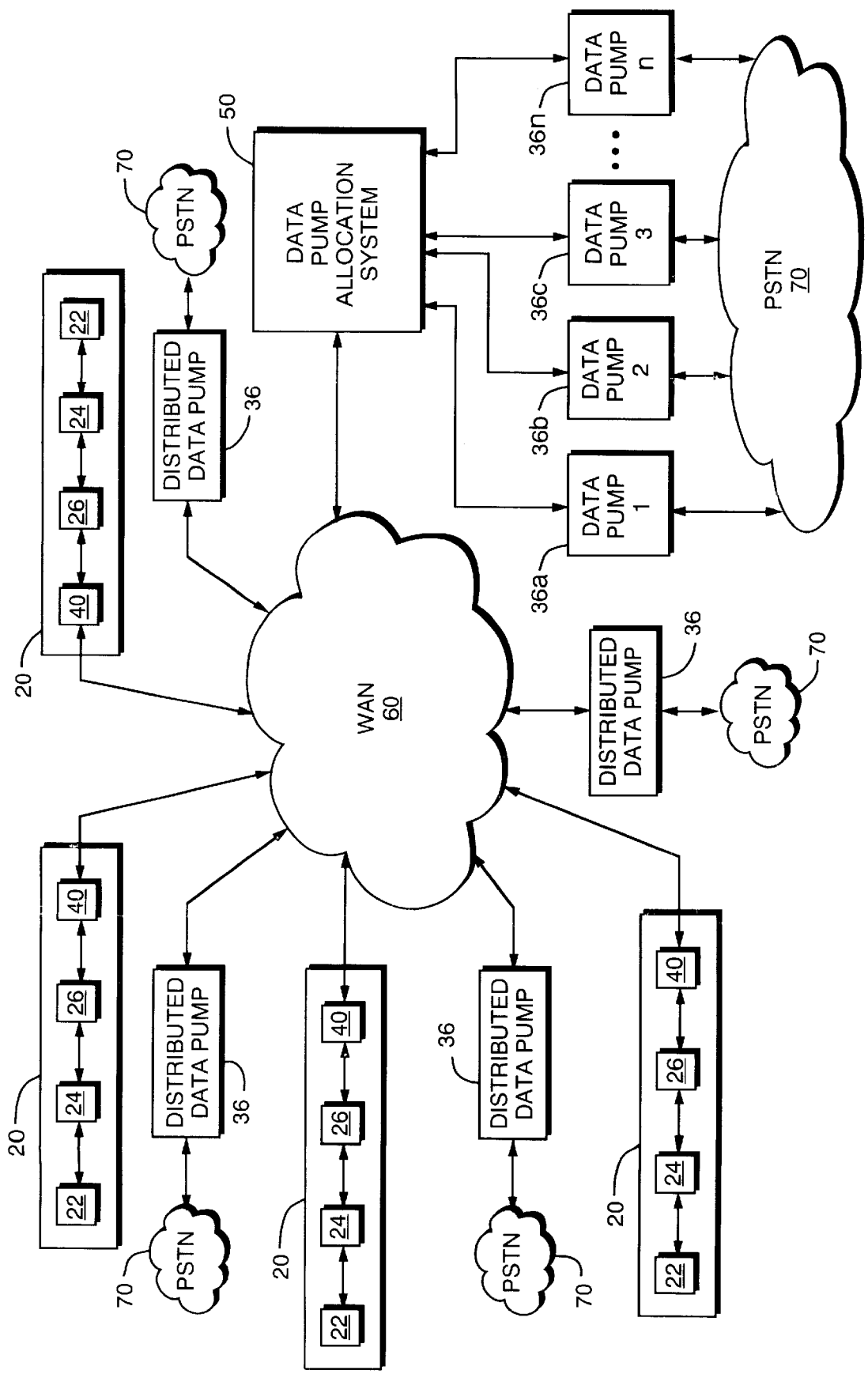
FIG. 4 is a block diagram of a more robust embodiment of the present invention wherein a plurality of client computers communicate with a remote data pump allocation system over a computer network.

A delayed modem allocation system and method according to the present invention is shown in FIGS. 3 and 4. Like the static modem allocation configuration of FIG. 2, the configuration of FIGS. 3 and 4, utilizes a "virtual COM port" 26 which is provided by a client computer operating system 24 to allow a software application 22 to communicate with what appears to the software application 22 to be a conventional physical modem 36 over a computer network 28 such as a Wide Area Network (WAN) or even a global computer network, such as the Internet.

However, the present invention departs significantly from the prior art by separating the two functional components included in conventional, prior art modems. A conventional modem comprises two major subsystems. The first is the modem controller while the second is the data transmission/reception engine or "data pump". The modem controller subsystem 40 manages the interface between the modem and the computer/software application utilizing the modem both via UART signals and data passed between the computer/modem interface. The modem controller 40 is also responsible for implementing the AT Command Set and configuring the data pump 36 in response to those commands.

The data pump subsystem 36 is responsible for managing the interface to the telecommunications network, such as the public switched telephone network (PSTN), including dialing, hang up, negotiating the signaling protocol, and encoding/decoding data based on audio signals on a telephone line and signals received over the computer network 28.

In conventional modem implementations, the modem controller and data pump co-exist in a single unit, either an external chassis or a single board. However, as will be explained more fully below, the present invention distributes the modem controller and data pump functions over a computer network 28.

In the present invention, a local modem controller 40 is provided for each computer 20 that is connected to the computer network 28. In one preferred embodiment, the local modem controller 40 is implemented in software running on the same computer 20 running a software application 22. When the software application 22 desires a modem connection, the operating system (O/S) 24 opens a virtual COM port 26, which interacts directly with the local modem controller 40.

However, distributing the modem components introduces a number of problems that must be addressed. For example, one significant problem associated with such a distributed system is that once a software application 22 running on a client computer 20 opens a virtual COM port 26 via O/S 24, the software application 22 expects an immediate, near-zero-latency connection to a modem. Unfortunately, transmission time and delays associated with network communications often fall short of the required ideal latency. Therefore, the likelihood of raising false error conditions exists. In addition, network connection set-up times, including authentication and encryption negotiations, exacerbate the problem.

Another problem that is introduced by using a variety of data pumps involves the command languages utilized by various brands and models of modems. While the command language for modems (often called the "AT" Command Set) is similar across most makes and models of modems, each modem implements the AT Command Set slightly differently. This is analogous to speaking a different dialect of a common language. Differing dialects often create errors in communication flow. Therefore, in one embodiment of the invention, the local modem controller 40 includes a comprehensive dialect that will merge the various modem dialects that understand ISDN-related modem commands, analog-related modem commands and fax-related modem commands. This comprehensive dialect will provide universal compatibility between the local modem controller 40 and most known modems and modem data pumps.

The local modem controller 40 will appear to the software application 22 to be a standard modem when, in fact, it will only comprise a subset of the components of a prior art modem. The software application 22 will interact with the modem controller 40 and the modem controller 40 will provide all of the appropriate responses to modem commands issued by the software application 22 in the required and expected time frames. The modem controller 40 will also store all of the command information that it receives in a format that will allow a subsequently assigned data pump to be indexed or initialized to a desired state as will be explained more fully below.

The data pump functions are provided by a plurality of data pumps 36a–n which are linked to the client computer 20 over the computer network 28. In one embodiment, the data pumps 36a–n are standard modems, which include both the data pump and modem controller functional units. However, when such prior art modems are utilized, the local modem controller 40 of the present invention will assume all of the modem control functions and the standard modems will be utilized solely for their data pump components. Bypassing the modem controllers included in the standard modems 36 may be accomplished using APIs, which are well known to those skilled in the art.

The data pumps 36a–n are connected to the computer network 28 via a data pump allocation system 50. The data pump allocation system 50 includes a data pump allocator 52, which controls the allocation of data pumps 36a–n to the client computer 20 running the software application 22 over the computer network 28.

When the data pump allocator 52 receives a data pump allocation request from a modem controller 40, the data pump allocator 52 determines a "best fit" data pump to allocate to the modem controller 40 initiating the data pump allocation request. In order to determine the "best fit" data pump, each data pump allocation request will include a variety of information, including information that will identify the type of data pump required and the ultimate geographic destination requirement of the data pump. For example, a modem controller may require an ISDN modem or a fax-modem. The data pump allocation request will also include information necessary to determine the ultimate destination of a data transmission, such as a telephone number for a data receiving device. As will become more fully apparent below, this information is utilized by the data pump allocator 52 to determine, among other items, a least cost routing for the data transmission.

Utilizing the information received in a data pump allocation request, the data pump allocator 52 will search a data pump status table 54 and select a specific data pump 36 to allocate to the requesting modem controller. Of course, the data pump status table 54 will include the information necessary for each potentially available data pump 36, such as its type, its assignment status, its location, etc. so that the data pump allocator 52 will be able to determine which of the available data pumps 36 will be best suited ("best fit") to handle a specific data pump request.

Each modem allocation request will also contain all of the information necessary to initialize and index a data pump 36 to a state corresponding to the state expected by the software application 22 issuing the data pump allocation request. This modem state information will be utilized by a data pump initializer 56 to initialize and index the assigned data pump 36 to the expected state. The modem state information may be in the form of a command string or, preferably in the form of a set of register values that can be implemented in an allocated data pump by the data pump initializer 56.

A more robust embodiment of the present invention is shown in FIG. 4. In this embodiment, the data pump allocation system 40 is implemented on a large scale using a highly-distributed collection of data pumps 36, which are available to a plurality of distributed client computers 20 over a wide area network (WAN) 60, such as the public Internet. The available data pumps may be local or distributed data pumps 36. The local data pumps 36 interface directly with the data pump allocation system 50 and with telephone communication lines, such as the PSTN 70.

Alternatively, the data pump allocation system 50 may assign one of a plurality of distributed data pumps 36 to a modem controller 40 issuing a data pump allocation request to a single data pump allocator 52 via the wide area network 60. One advantage of the use of distributed data pumps is that this configuration will allow the system to utilize low cost data transmission over the wide area network 60 and only interface the PSTN 70 at a local level.

Figure 5:
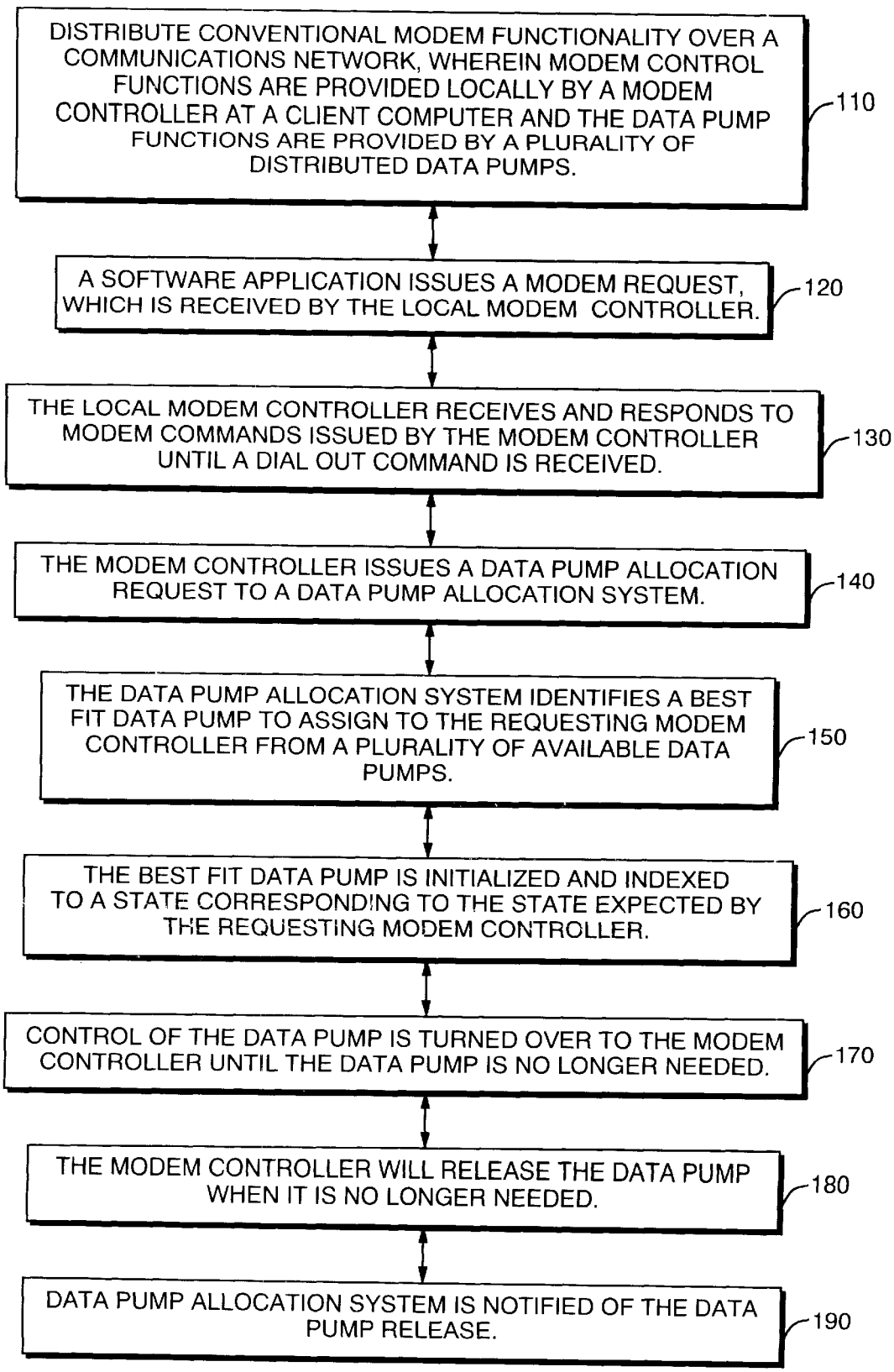
FIG. 5 is a flow chart showing a method of delayed modem allocation according to one feature of the present invention.

FIG. 5 provides a flow chart of a method 100 of delaying the allocation of a modem to a software application according to one embodiment of the present invention. The method 100 begins by distributing conventional modem functionality over a computer network, step 110, wherein the modem control functions are provided locally by a modem controller at a client computer and the data pump functions are provided by a plurality of data pumps distributed over the computer network. When a software application running on a client computer issues a modem request, the request is received by the local modem controller, step 120.

The local modem controller appears to the software application to be a conventional modem and, in step 130, receives and responds to modem commands issued by the software application until a "dial-out" or similar "connect" command is received. At this point, in step 140, the modem controller issues a data pump allocation request to a data pump allocation system.

Upon receipt of a data pump allocation request, the data pump allocation system identifies a "best fit" data pump to assign to the requesting modem controller based on information included in the data pump allocation request, step 150. In one embodiment, the best fit data pump will be identified by searching a data pump status table, which will include information pertinent to making a best fit decision, such as the required type, location and assignment status of the data pumps available to the data pump allocation system.

Once identified, the best fit data pump will be initialized and indexed or initialized to a state corresponding to the modem state expected by the requesting modem controller, step 160. Once the data pump is indexed to the expected state, then, in step 170, the control of the data pump will be turned over to the modem controller that initiated the data pump allocation request until the data pump is no longer needed. Preferably, the data pump status table will be updated to reflect that the allocated data pump is currently being utilized by a modem controller and is, therefore, unavailable for allocation to a subsequently issued data pump allocation request.

When the data pump is no longer required then, in step 180, the modem controller will release the data pump. The release will be coupled with a notification issued to the data pump allocation system that the data pump has been released, step 190. Accordingly the data pump allocation system will update its data pump status table to reflect that the released data pump is now available for allocation to another modem controller issuing a data pump allocation request.

Accordingly, the distributed and delayed modem allocation system and method of the present invention increases the efficiency of shared modem systems by delaying the assignment of a physical modem to a software application requiring a modem until an optimum point in time, while maintaining critical software-to-modem timing and protocol.

Modifications and substitutions by one of ordinary skill in the art are considered to be within the scope of the present invention.

What is claimed is:

1. A method of distributing the allocation of a data pump to a modem controller communicating with a software application running on a computer communicating with a data pump allocation system over a computer network, said method comprising the steps of:

distributing conventional modem functionality over a computer network, wherein modem control functions are provided locally by at least one local modem controller associated with each computer connected to the network and wherein data pump functions are provided by a plurality of data pumps distributed over said computer network;

issuing a modem request by a software application running on a networked computer and receiving said request by said local modem controller associated with said computer issuing the modem request;

receiving and responding to modem commands issued by the software application at said local modem controller until a "dial-out" command is received by said modem controller;

issuing a data pump allocation request to a data pump allocation system linked to said computer over said computer network;

identifying a best fit data pump to assign to the requesting modem controller based on information included in the data pump allocation request;

initializing and indexing the assigned best fit data pump to a state corresponding to a modem state expected by the requesting modem controller;

turning control of the data pump over to the modem controller until the data pump is no longer needed;

releasing the data pump when it is no longer needed; and notifying the data pump allocation system that the data pump has been released.

2. A distributed modem allocation system, for assigning a data pump selected from a plurality of data pumps to a software application running on at least one computer that is communicating with the distributed modem allocation system over a computer network, said system comprising;

a plurality of local modem controllers, at least one local modem controller for each computer communicating with the distributed modem allocation system over the computer network, each said local modem controller for receiving and responding to modem request commands issued by said software application to said local modem controller until a "dial-out" command is received by said modem controller, and responsive to said "dial-out" command, for issuing a data pump allocation request; and a data pump allocation system, responsive to said data pump allocation request, for identifying a best fit data pump to assign to said requesting local modem controller based on information included in said data pump allocation request, for initializing and indexing the identified and assigned best fit data pump to a state corresponding to a modem state expected by said requesting local modem controller, for turning control of the data pump over to said local modem controller until the data pump is no longer needed, for tracking assigned modem data pumps, for releasing the data pump when it is no longer needed, and for tracking data pumps that have been released.

3. The distributed modem allocation system of claim 2, wherein at least one of said local modem controllers is implemented in hardware.

4. The distributed modem allocation system of claim 2, wherein said computer network comprises a local area network.

5. The distributed modem allocation system of claim 2, wherein said computer network comprises a wide area network.

6. The distributed modem allocation system of claim 5, wherein said wide area network comprises a global computer network.

7. The distributed modem allocation system of claim 6, wherein said global computer network comprises the Internet.

* * * * *